US009459856B2

United States Patent
Curzi et al.

(10) Patent No.: US 9,459,856 B2
(45) Date of Patent: Oct. 4, 2016

(54) EFFECTIVE MIGRATION AND UPGRADE OF VIRTUAL MACHINES IN CLOUD ENVIRONMENTS

(71) Applicant: International Business Machines Corporation, Armonk, NY (US)

(72) Inventors: Francesca Curzi, Rome (IT); Michael Ryan, Galway (IE)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 13/732,952

(22) Filed: Jan. 2, 2013

(65) Prior Publication Data

US 2014/0189677 A1    Jul. 3, 2014

(51) Int. Cl.
G06F 9/44      (2006.01)
G06F 9/445     (2006.01)
G06F 9/455     (2006.01)

(52) U.S. Cl.
CPC ............ G06F 8/65 (2013.01); G06F 9/45533 (2013.01)

(58) Field of Classification Search
None
See application file for complete search history.

(56) References Cited

U.S. PATENT DOCUMENTS

| 7,136,974 | B2  | 11/2006 | Burton et al. |
| 7,263,698 | B2  | 8/2007  | Wildhagen et al. |
| 8,245,192 | B1* | 8/2012  | Chen ................... G06F 8/30 717/103 |
| 2003/0018932 | A1* | 1/2003 | Blum ................... G06F 11/273 714/46 |
| 2007/0192765 | A1* | 8/2007 | Shimogawa et al. ........... 718/1 |
| 2007/0245332 | A1  | 10/2007 | Tal et al. |
| 2007/0283314 | A1* | 12/2007 | Browning et al. ............ 717/100 |
| 2008/0052701 | A1* | 2/2008 | Abernethy et al. ........... 717/170 |
| 2009/0113410 | A1* | 4/2009 | Halliday ........... G06F 17/30306 717/169 |
| 2009/0113411 | A1* | 4/2009 | Halliday ........... G06F 17/30306 717/169 |
| 2009/0320014 | A1* | 12/2009 | Sudhakar ...................... 717/169 |
| 2010/0017800 | A1* | 1/2010 | Dow et al. ..................... 718/1 |
| 2010/0076934 | A1* | 3/2010 | Pershin et al. ................ 707/640 |
| 2010/0125841 | A1* | 5/2010 | Bauer et al. ................... 717/174 |
| 2010/0299666 | A1* | 11/2010 | Agbaria et al. ................ 718/1 |

(Continued)

OTHER PUBLICATIONS

"Tivoli Application Dependency Discovery Manager ," IBM, crawled Jun. 19, 2008.*

(Continued)

*Primary Examiner* — Insun Kang
(74) *Attorney, Agent, or Firm* — Stephen R. Tkacs; Stephen J. Walder, Jr.; Richard A. Wilhelm (57) ABSTRACT

A mechanism is provided in a data processing system for performing a system upgrade. Responsive to receiving selection of one or more virtual machines to upgrade with an upgrade package, the mechanism identifies a plurality of upgrade phases. The mechanism configures the plurality of upgrade phases and generates a pre-upgrade snapshot of each of the one or more virtual machines. The mechanism performs each upgrade phase in the plurality of upgrade phases to form an upgraded virtual machine and performs one or more upgrade validation tests on the upgraded virtual machine. Responsive to the one or more upgrade validation tests succeeding, the mechanism reverts back to the pre-upgrade snapshot.

21 Claims, 7 Drawing Sheets

(56) References Cited

U.S. PATENT DOCUMENTS

| | | | |
|---|---|---|---|
| 2011/0066597 A1* | 3/2011 | Mashtizadeh et al. | 707/640 |
| 2012/0084261 A1* | 4/2012 | Parab | 707/654 |
| 2012/0131567 A1* | 5/2012 | Barros et al. | 717/170 |
| 2012/0216181 A1* | 8/2012 | Arcese et al. | 717/168 |
| 2012/0291021 A1* | 11/2012 | Banerjee et al. | 717/173 |
| 2013/0262638 A1* | 10/2013 | Kumarasamy et al. | 709/221 |
| 2013/0275447 A1* | 10/2013 | Ben-Tsion et al. | 707/756 |
| 2014/0067763 A1* | 3/2014 | Jorapurkar et al. | 707/639 |
| 2014/0096134 A1* | 4/2014 | Barak et al. | 718/1 |
| 2014/0146055 A1* | 5/2014 | Bala et al. | 345/501 |
| 2014/0149352 A1* | 5/2014 | Chan et al. | 707/639 |
| 2014/0149494 A1* | 5/2014 | Markley et al. | 709/203 |
| 2014/0149591 A1* | 5/2014 | Bhattacharya et al. | 709/226 |
| 2014/0149983 A1* | 5/2014 | Bonilla et al. | 718/1 |
| 2014/0297597 A1* | 10/2014 | Matsubara et al. | 707/681 |

OTHER PUBLICATIONS

"IBM Tivoli Application Dependency Discovery Manager V7.1 is an auto-discovery solution, providing automated application dependency mapping and configuration auditing," IBM United States Announcement 207-322, dated Dec. 4, 2007.*

IBM Tivoli Application Dependency Discovery Manager Capabilities and Best Practices, IBM, Feb. 2008.*

Tivoli Application Dependency Discovery Manager (TADDM) Installation, Customization and Use , IBM, Jan. 2010.*

IBM Tivoli Application Dependency Discovery Manager, IBM, 2007.*

* cited by examiner

EFFECTIVE MIGRATION AND UPGRADE OF VIRTUAL MACHINES IN CLOUD ENVIRONMENTS

BACKGROUND

The present application relates generally to an improved data processing apparatus and method and more specifically to mechanisms for effective migration and upgrade of virtual machines in cloud environments.

Cloud computing is the use of computing resources (hardware and software) that are delivered as a service over a network (typically the Internet). Cloud computing entrusts remote services with a user's data, software and computation. Using software as a service, users also rent application software and databases. The cloud providers manage the infrastructure and platforms on which the applications run. End users may access cloud-based applications through a web browser or a light-weight desktop or mobile app while the business software and user data are stored on servers at a remote location.

In the software-as-a-service (SaaS) model, cloud providers install and operate application software in the cloud, and cloud users access the software from cloud clients. The cloud users do not manage the cloud infrastructure and platform on which the application is running. This eliminates the need to install and run the application on the cloud user's own computers, simplifying maintenance and support. What makes a cloud application different from other applications is its elasticity. This can be achieved by cloning tasks onto multiple virtual machines at run-time to meet the changing work demand. Load balancers distribute the work over a set of virtual machines. This process is inconspicuous to the cloud user who sees only a single access point.

SUMMARY

In one illustrative embodiment, a method, in a data processing system, is provided for performing a system upgrade. The method comprises responsive to receiving selection of one or more virtual machines to upgrade with an upgrade package, identifying a plurality of upgrade phases. The method further comprises configuring the plurality of upgrade phases and generating a pre-upgrade snapshot of each of the one or more virtual machines. The method comprises performing each upgrade phase in the plurality of upgrade phases to form an upgraded virtual machine and performing one or more upgrade validation tests on the upgraded virtual machine. The method further comprises responsive to the one or more upgrade validation tests succeeding, reverting back to the pre-upgrade snapshot.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for upgrading virtual machines in cloud environments. The mechanism identifies software prerequisites for upgrade and runtime dependencies. The mechanism supports customers in adding validation tests for their business logic to the base test suite. The mechanism runs the upgrade unattended and alerts a user when an error occurs. The mechanism also validates the migration or upgrade. The mechanism supports complex phased upgrades by validating a current phase before proceeding to the next phase. The mechanism recovers from failures by restoring virtual machine snapshots and confirming the recovered virtual machine is working. The mechanism does this without having to wait for manual administrator intervention, hence minimizing downtime and cost of any failed upgrade. The mechanism may also take a snapshot of the failed upgrade for offline analysis.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a nonexhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
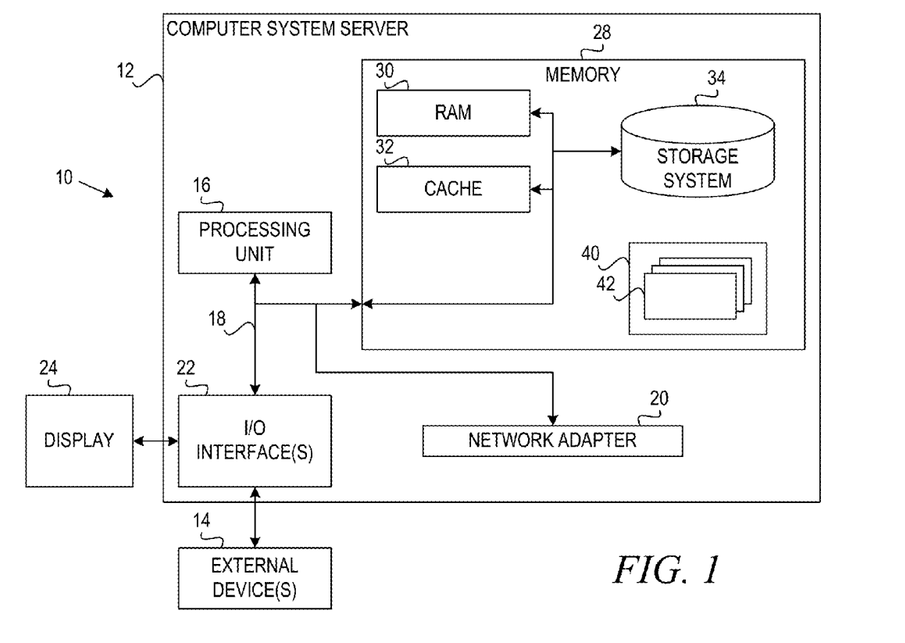
FIG. 1 depicts a cloud computing node according to an illustrative embodiment.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
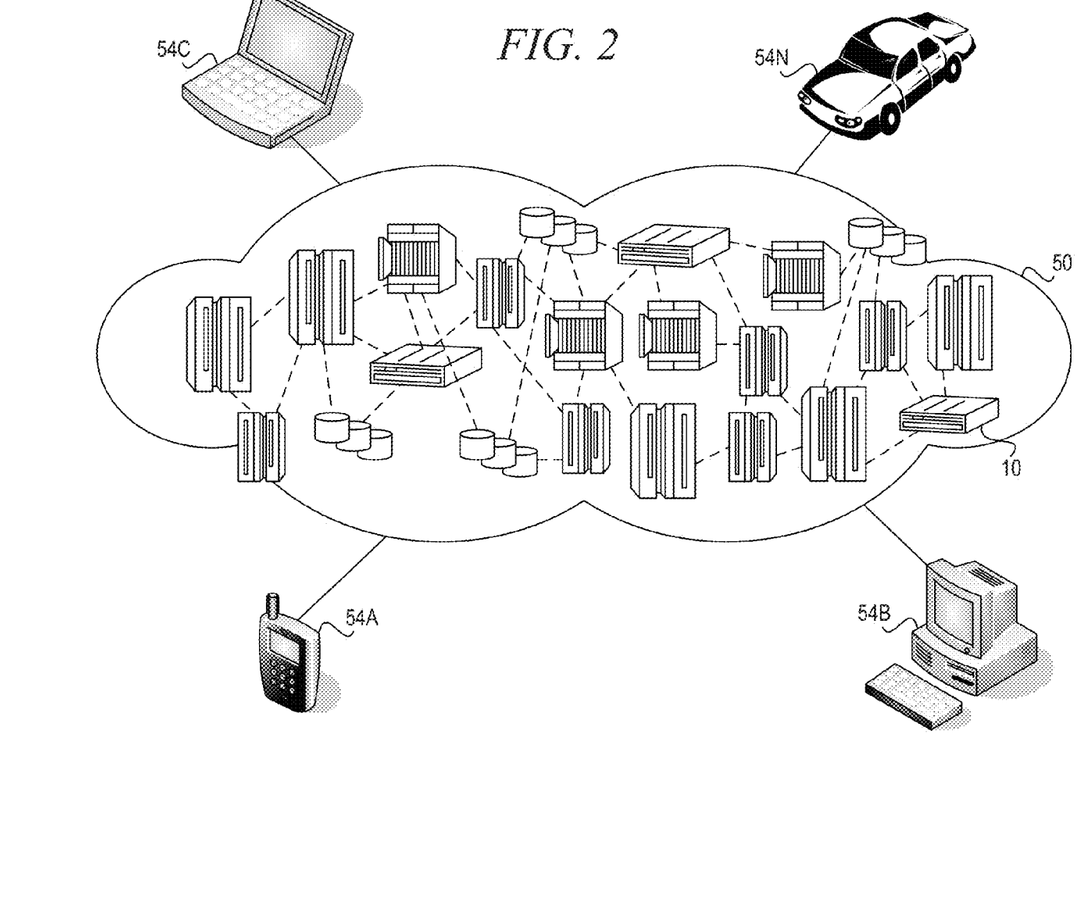
FIG. 2 depicts a cloud computing environment according an illustrative embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
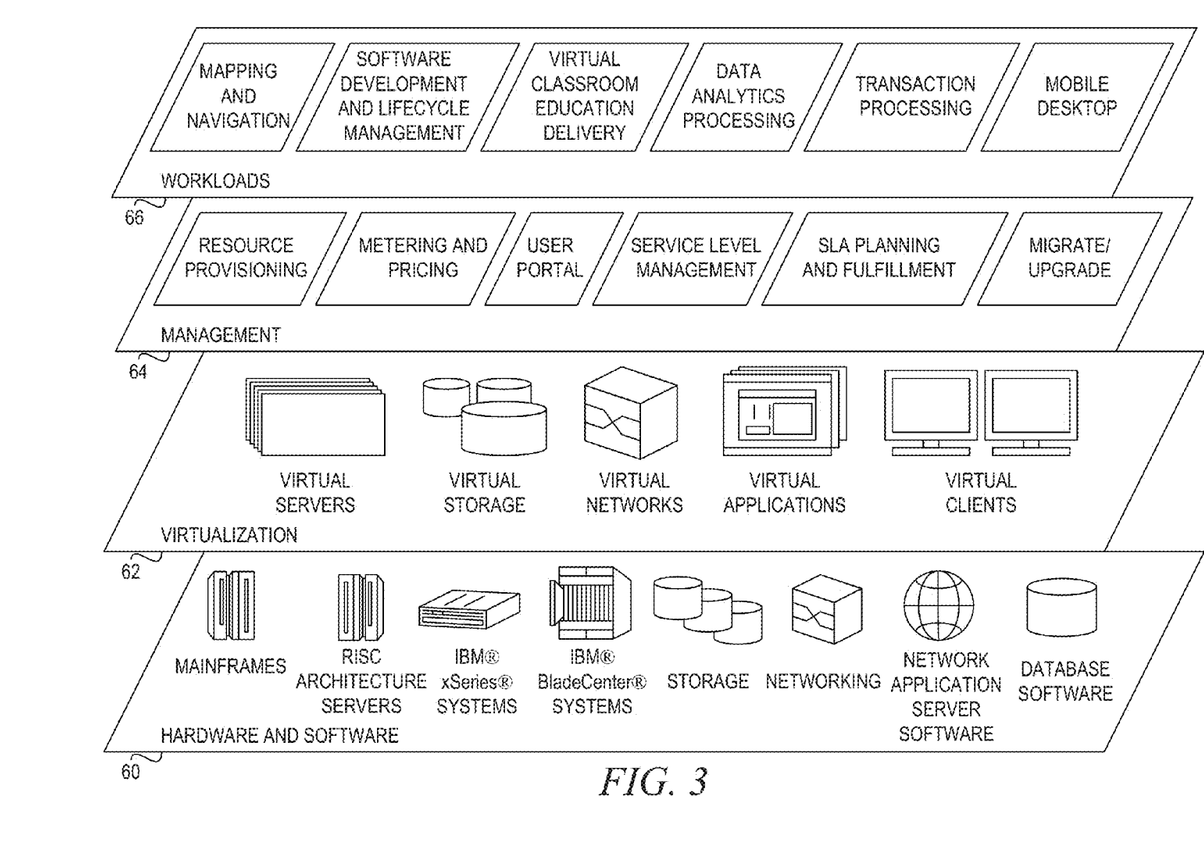
FIG. 3 depicts abstraction model layers according to an illustrative embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. The migrate/upgrade component provides a mechanism for upgrading virtual machines in cloud environments.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Product migration/upgrade process is a very crucial aspect for a software system. In the prior art, no specific tool is provided to the customers to support them during the upgrade/migration process and to validate that the upgrade process did not corrupt their data or impact integrated applications. Customers need to access multiple panels in their user interface and start using the system and perform customized sanity checks. This cost of validating an upgrade without tools can discourage users from doing regular upgrades and can lead to longer periods between upgrades and poorer end user satisfaction, as they live with annoying usability problems that are not critical enough to trigger an upgrade.

With the adoption of virtual appliance (pre-built software solutions, comprised of one or more virtual machines that are packaged, updated, maintained, and managed as a unit) and cloud solutions, the upgrade/migration process becomes more complex, because the customer must manage multiple integrated systems.

In accordance with an illustrative embodiment, a system based on an interactive tool and mechanisms to support customers in the upgrade/migration of a solution are provided. The system reduces the cost and risk of upgrades and migrations of virtual appliances and cloud solutions.

Existing upgrade and migration solutions only detect fatal errors and do not validate business logic, and this implies additional work to be manually done after an upgrade. An upgrade or migration can break business logic or integrations as a side effect, and only enterprise/customer specific tests can validate the process was a success. These mechanisms provide a framework for validating the upgrade or migration, reducing time delays scheduling and running manual acceptance testing. As these tests are repeated on all machines, it is far easier to identify specific machines that failed to upgrade, due to a unique problem on that machine, for example.

Existing upgrade and migration solutions may try to rollback failed upgrades, and the mechanisms of the illustrative embodiments make use of virtual machine snapshots to reduce the risk and recover from failed upgrades. In accordance with the illustrative embodiments, the machine can be restored to a working state without human intervention once a validation test fails. The mechanisms of the illustrative embodiments provide components to effectively manage the migration and upgrade process. The mechanisms will work at an enterprise solution level and not only at a stand-alone application or host machine level. In the description of the illustrative embodiments and figures, for simplicity the word "upgrade" may refer to "migration and upgrade."

Figure 4:
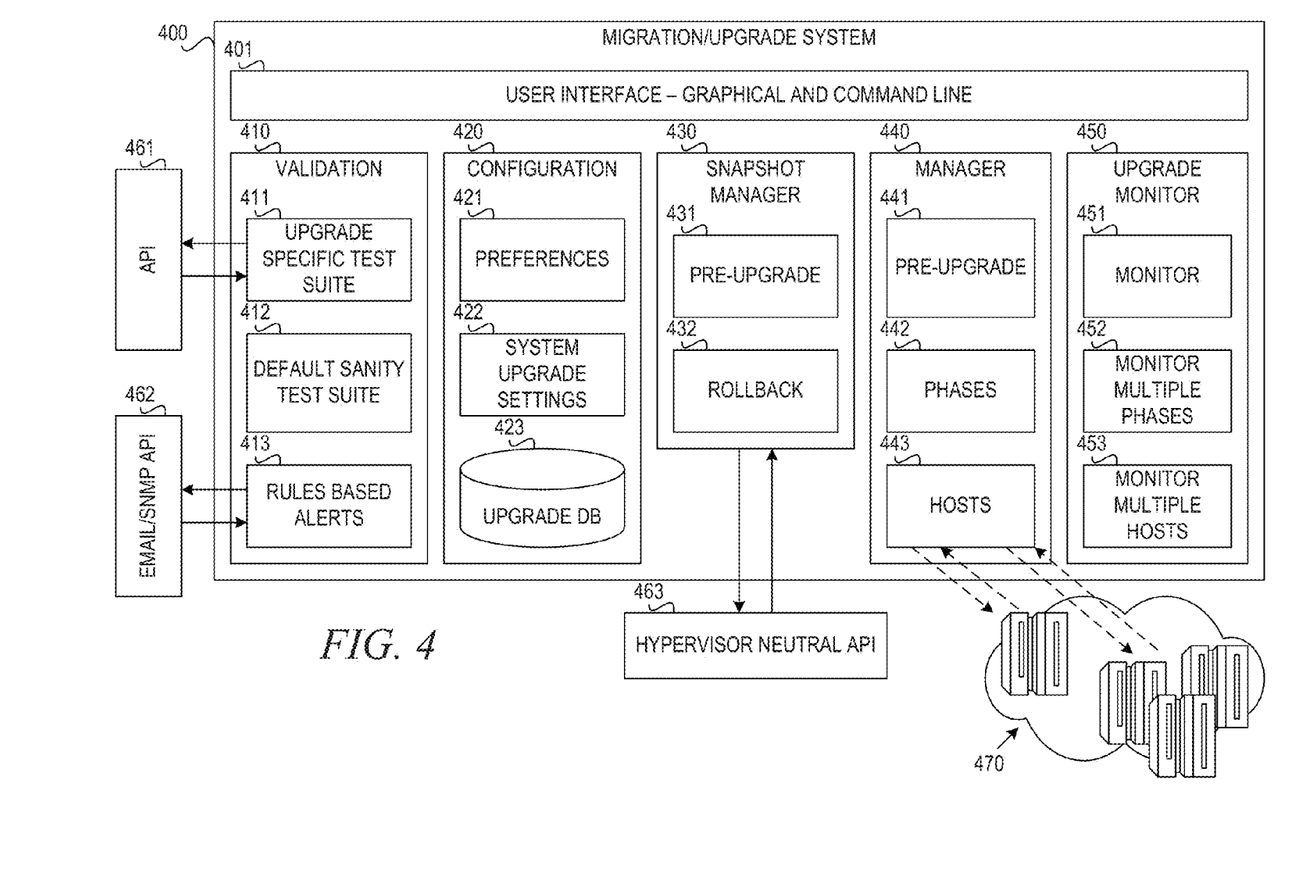
FIG. 4 is a block diagram illustrating components of a migration and upgrade system in accordance with an illustrative embodiment.

FIG. 4 is a block diagram illustrating components of a migration and upgrade system in accordance with an illustrative embodiment. Migration/upgrade system 400 includes user interface 401, which may include a graphical and command line interface 401. Validation manager 410 includes upgrade specific test suite 411, default sanity test suite 412, and rules based alerts 413. Default sanity test suite 412 manages the automated test suite to perform the sanity test before an upgrade takes place. A sanity test determines whether the upgraded application works the same way it did before the upgrade. Default sanity test suite 412 focuses on runtime dependency changes to verify that a selected component to be upgraded does not affect something else running in the system, prerequisites or software upgrade checks (i.e., Java™ programming language, WebSphere® application server (WAS), DB2® database system, operating system (OS)), and identifying integrated product relationship.

Upgrade specific test suite 411 manages the automated test suite developed by a customer or software provider to sanity test key features and integrations on initial application install or upgrade. Application programming interface (API) 461 allows the customer or software provider to import and customize upgrade specific tests.

Rules based alerts 413 provides notification to a customer or administrator regarding success/failure of an upgrade. Rules based alerts 413 may communicate through email/simple network management protocol (SNMP) API 462 to provide notifications, for example. Rules based alerts 413 may use other techniques for notification, such as short message service (SMS) messaging, for example. Rules based alerts 413 allows one to configure specific rule based alerts related to upgrade failures to support unattended upgrade. This functionality can be very useful because upgrades and migrations are normally scheduled for periods of off-peak system usage. The administrator may prefer to have the upgrade run unattended and only be alerted if something goes wrong. Rules based alerts 413 provides alerts if certain upgrades fail and allows the administrator to elect to continue if non-key system components fail to upgrade and must be un-installed manually.

Configuration component 420 includes preferences 421, system upgrade settings 422, and upgrade database 423. Preferences 421 allow the customer or administrator to define preferred settings, such as whether the administrator is notified for particular upgrade failures, whether particular upgrades can be rolled back and uninstalled, etc. System upgrade settings 422 allow the administrator to define the upgrade settings, such as the machines to be upgraded and the phases of the upgrade, for example. Upgrade database (DB) 423 stores software components for the upgrade.

Snapshot manager 430 includes pre-upgrade component 431 and rollback component 432. Snapshot manager 430 communicates with hypervisor neutral API 463 and handles the virtual machine (VM) snapshots related to system backup. When an upgrade fails, snapshot manager 430 takes a snapshot of the VM with the failed upgrade for offline analysis. Snapshot manager 430 may roll back to the pre-upgrade snapshot. Snapshot manager 430 supports the manager in removing the failed upgrade snapshot if the administrator is satisfied to prevent memory waste.

Manager component 440 includes pre-upgrade component 441, phases component 442, and hosts component 443. Manager component 440 manages the specific upgrade/migration process to be started, identifying which components are to be upgraded. Pre-upgrade component 441 manages the pre-upgrade process to initialize the upgrade. Phases component 442 manages the phases of the upgrade process. Hosts component 443 communicates with hosts 470 to upgrade software components on hosts 470.

Upgrade monitor 450 includes monitor 451, monitor multiple phases 452, and monitor multiple hosts 453. Upgrade monitor 450 supports the administrator in the upgrade process. Upgrade monitor 450 monitors the upgrade on multiple hosts based on the configured setting. With an application distributed across multiple host machines 470 or runtime dependencies existing between applications on separate host machines. In this case, the framework coordinates the upgrade and/or migration based on associations it has discovered or was configured with.

Pre-upgrade component 441 discovers application dependencies. Pre-upgrade component 441 discovers runtime dependencies via hosts component 443. Based on the application dependencies and runtime dependencies, pre-upgrade component 441 recommends phases to phases component 442.

Figure 5A:
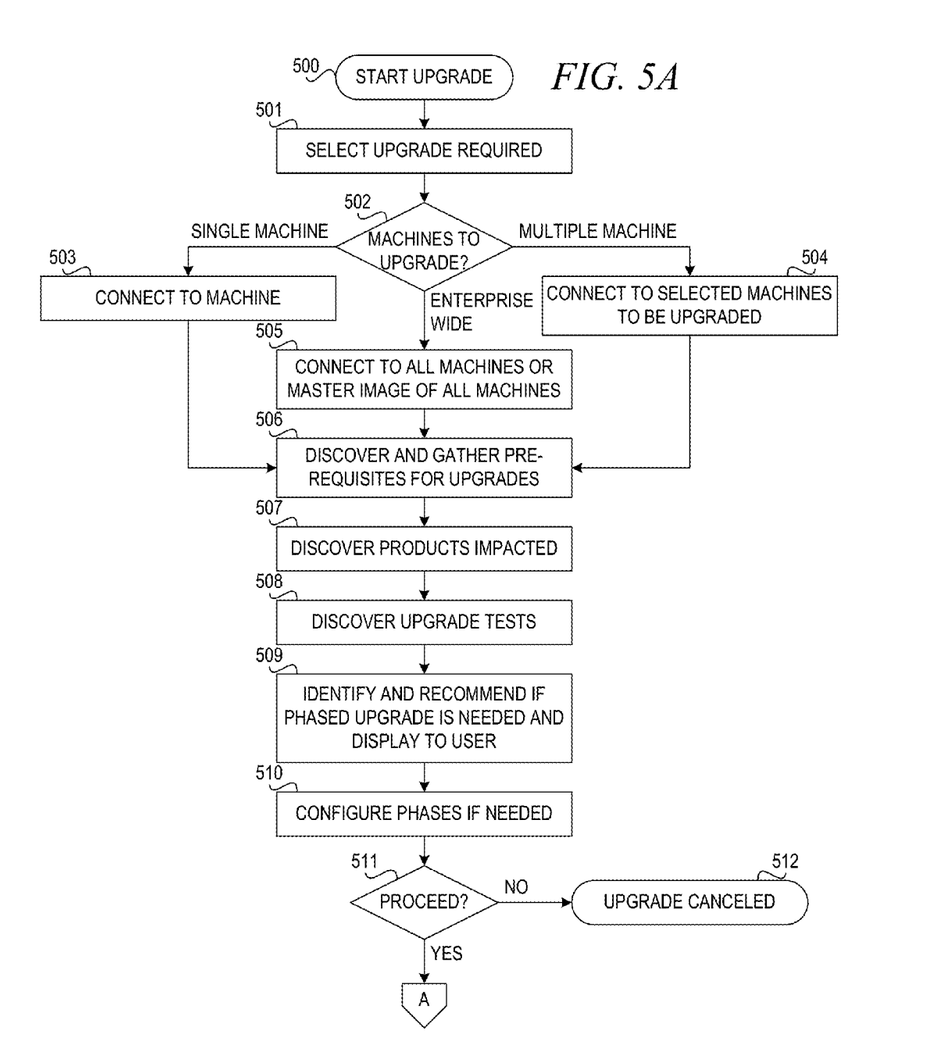
FIGS. 5A and 5B present a flowchart illustrating operation of migration and upgrade process in accordance with an illustrative embodiment.
Figure 5B:
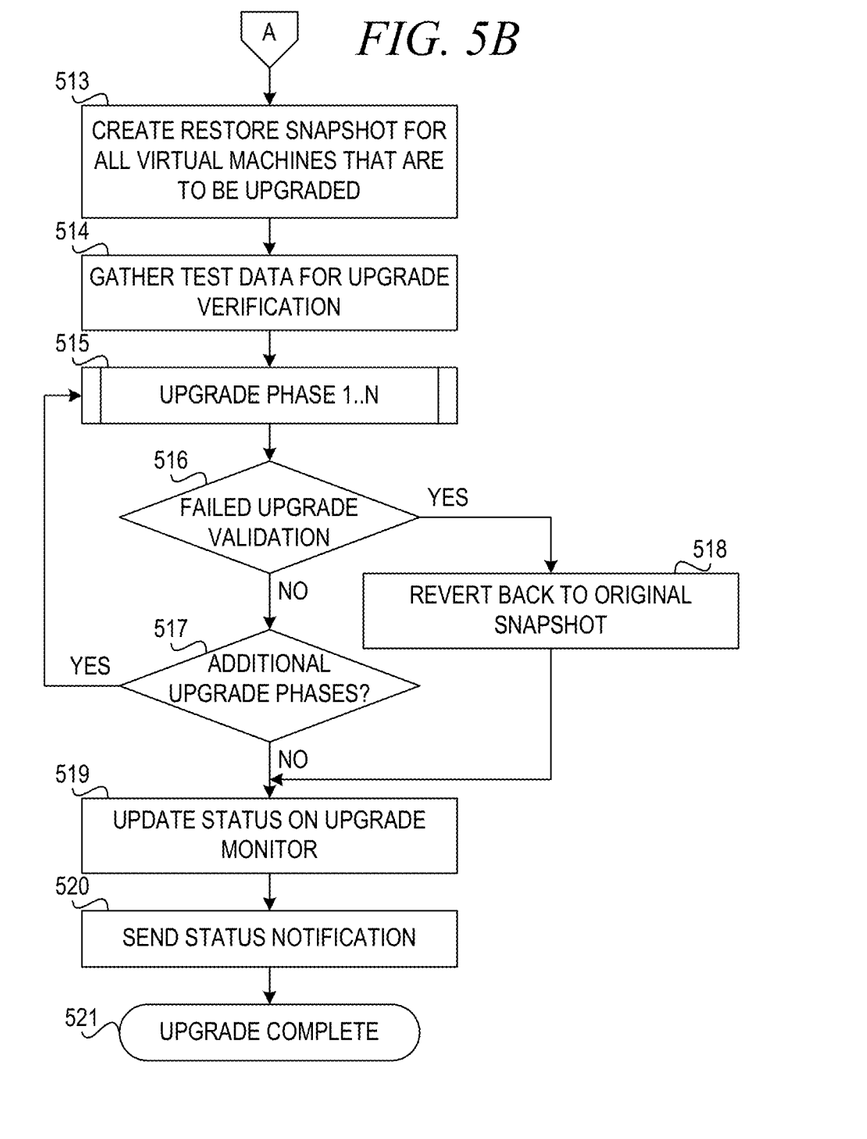

FIGS. 5A and 5B present a flowchart illustrating operation of mechanism for migration and upgrade in accordance with an illustrative embodiment. The migration and upgrade process provides significant advantages over existing systems, in particular when upgrading cloud virtual machines. The process identifies runtime dependencies and software prerequisites for upgrade, validates the migration and upgrade, sends status alerts to support unattended upgrade, and recovers from failures by restoring virtual machine snapshots and snapshot the failed upgrade virtual machine for offline analysis.

With reference to FIG. 5A, operation begins as the mechanism starts the upgrade (block 500). The mechanism selects an upgrade required (block 501). The user may select the type of upgrade to perform via a graphical user interface (GUI) or command line interface. The mechanism may read the upgrade/migration packages from a file directory and present the list of upgrade/migration options to the user. The mechanism may provide the user the option to upgrade a single machine, multiple machines, or enterprise wide upgrade.

The mechanism then identifies the machines to upgrade (block 502). If the machines to upgrade comprise a single machine, the mechanism connects to the single machine (block 503). If the machines to upgrade comprise multiple machines in block 502, the mechanism connects to selected machines to be upgraded (block 504). If the machines to be upgraded comprise an enterprise wide system in block 502, the mechanism connects to all machines or a master image of all machines (block 505).

After connecting to the machine(s) in block 503, block 504, or block 505, the mechanism discovers and gathers pre-requisites for the upgrade (block 506). The mechanism may discover and gather pre-requisites in the background and save a significant amount of time for the administrators, because the administrators do not need to stop/start the install or manually fetch packages. As an example, the upgrade of the application may also require new versions of Java™ runtime and DB2® database system.

Then, the mechanism discovers products impacted (block 507) and discovers upgrade tests (block 508). The products may comprise integrated products. The mechanism may present the products to the user to be tested post upgrade. Administrators often want the upgrade to run unattended, report when an error occurs, and revert to the original version. An upgrade validation test may confirm the upgrade was successful and support complex phased upgrades by validating a current phase before proceeding to the next phase. The system can include out-of-the-box upgrade validation automated test suite to test standard components, such as a DB2® database system, Appservers, Web browsers for work following the upgrade. Each upgrade package can optionally provide validation tests, and the administrator can have his own acceptance tests executed by placing them in the validation tests directory. The validation component discovers the upgrade tests and provides a collection of scripts and executables to be run before the upgrade to collect data in the application database and post upgrade to perform consistency checks.

The mechanism may select upgrade tests in block 508 based on the applications to be upgraded and possibly the application dependencies (both upstream and downstream). The upgrade tests may be specific to the customer environment, that is, the specific operating system or hardware systems. The upgrade tests may be supplied with the application upgrade or developed by the customer or the customer's integrator. Pre-requisites, products impacted, and other dependencies may be machine dependent.

If supported or where multiple applications are to be upgraded, the mechanism identifies and recommends if phased upgrade is needed and displays the recommendation to the user (block 509). The mechanism then configures phases, if needed (block 510). The mechanism may configure phases on a machine-by-machine basis, on an application-by-application basis, or on a dependency basis. The phases for a given application may include upgrade tests for the application's dependencies, for the application, and for other applications that are dependent upon the given application.

An upgrade may take a number of hours. The administrator may choose to proceed or abort based on risk due to systems impacted or need to gather more validation tests. The mechanism determines whether the user selects to proceed (block 511). If the user selects to not proceed, the mechanism cancels the upgrade and operation ends (block 512).

Turning to FIG. 5B, if the user selects to proceed in block 511, the mechanism creates a restore snapshot for all virtual machines that are to be upgraded (block 513). In virtualized cloud environments, the mechanism snapshots the pre-upgrade/pre-migration state so that it can revert to it if needed during the install. The method gathers test data for upgrade verification (block 514). If the upgrade fails, the mechanism can revert to the working state and start the application without having to wait for manual administrator intervention. This both supports unattended install and avoids downtime due to the failed upgrade. When upgrading non-virtualized environments, the mechanism can run backup scripts provided by the upgrade package.

The mechanism performs a first phase of the upgrade (block 515). The process of performing an upgrade phase is as described below with respect to FIG. 6. The mechanism determines whether the current phase failed upgrade validation (block 516). If the phase passes upgrade validation, the mechanism determines whether additional phases are needed (block 517). If additional phases are needed, operation returns to block 515 to perform the next upgrade phase.

If the current phase fails upgrade validation in block 516, the mechanism reverts back to the original snapshot (block 518). Thereafter, or if no additional phases are needed in block 517, the mechanism updates the status of the upgrade on an upgrade monitor or dashboard (block 519). The mechanism sends status notification (e.g., SMS, event, email, etc.) to the administrator and interested parties (block 520). Where multiple machines are being upgraded, the notification may identify which machines were upgraded successfully and which upgrades are in progress, failed, or queued, for example. Finally, the mechanism completes the upgrade and operation ends (block 521).

Figure 6:
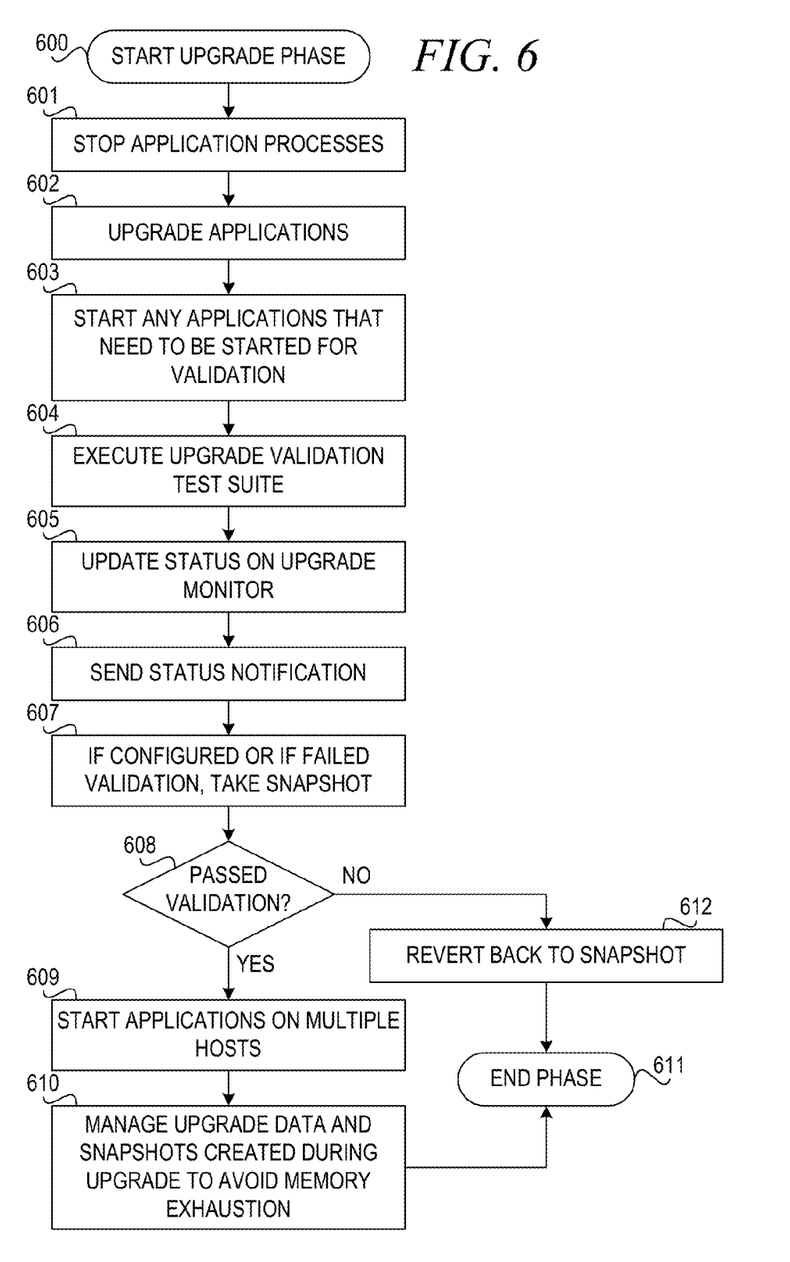
FIG. 6 is a flowchart illustrating an upgrade phase mechanism in accordance with an illustrative embodiment.

FIG. 6 is a flowchart illustrating an upgrade phase mechanism in accordance with an illustrative embodiment. Operation begins, and the mechanism starts an upgrade phase (block 600). The mechanism stops all application processes that must be stopped before the upgrade can be carried out (block 601). The mechanism then calls on the upgrade scripts in the upgrade package to perform the upgrade on applications (block 602). Following upgrade, the mechanism starts any applications that must be started for validation (block 603). The mechanism executes the upgrade validation test suite (block 604). The mechanism may display the update status on an upgrade monitor or dashboard (block 605). Where multiple machines are being upgraded, the results for each machine may be displayed on the monitor. The automated validation test suite is run on all machines. The upgrade monitor may identify specific machines that failed to upgrade due to problems unique to that machine or configuration.

The mechanism then sends status notification (e.g., SMS, event, email, etc.) to the administrator and interested parties (block 606). If configured to, or if failed validation, the mechanism takes a snapshot of the upgraded machine (block 607). The mechanism then determines whether the validation tests passed (block 608). If the validation tests passed, the mechanism starts the applications on multiple hosts that needed to be stopped while upgrade was in progress (block 609). The mechanism manages upgrade data and snapshots created during upgrade to avoid memory exhaustion (block 610). For example, the mechanism may schedule upgrade data for deletion and notify the user. Thereafter, the mechanism ends the phase and operation ends (block 611).

If the upgrade fails in block 608, the mechanism reverts back to the snapshot (block 612). The snapshot of the failed upgrade may be diagnosed offline or at off-peak period. The mechanism may also restart applications, returning the machine to a healthy running state. Thereafter, the mechanism ends the phase and operation ends (block 611).

Thus, the illustrative embodiments provide mechanisms for effective migration and upgrade of virtual machines in cloud environments. The illustrative embodiments provide enterprise-to-enterprise (E2E) management of the upgrade/migration process in virtual appliances and cloud solutions. The illustrative embodiments provide real time notification of the upgrade/migration process in a phase approach. The illustrative embodiments provide integrated consistency and data validation inside the migration/upgrade process to drive the overall migration/upgrade procedure.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performing a system upgrade, the method comprising:
   receiving selection of a computing environment to upgrade with an upgrade package, wherein the upgrade package is configured to perform an upgrade on one or more software applications in the computing environment;
   discovering application dependencies for the upgrade in the computing environment;
   configuring a plurality of upgrade phases based on the application dependencies;
   selecting one or more upgrade validation tests for the upgrade package based on applications to be upgraded of the computing environment and the application dependencies, wherein the one or more upgrade validation tests are specific for the selected computing environment;
   generating a pre-upgrade snapshot of the computing environment;
   performing each upgrade phase in the plurality of upgrade phases to form an upgraded computing environment and performing the one or more upgrade validation tests on the upgraded computing environment, wherein each phase is validated before processing to a next phase in the plurality of upgrade phases; and
   responsive to a given upgrade validation test failing for a given virtual machine in the computing environment, reverting the given virtual machine back to the pre-upgrade snapshot without human intervention.

2. The method of claim 1, wherein the one or more upgrade validation tests comprise one or more environment specific tests imported from a customer or administrator via an application programming interface.

3. The method of claim 1, wherein receiving selection of the computing environment to upgrade comprises receiving a selection of a single virtual machine, a plurality of selected virtual machines, or an enterprise wide upgrade.

4. The method of claim 3, further comprising responsive to receiving selection of an enterprise wide upgrade for an enterprise, connecting to a master image of all machines in the enterprise.

5. The method of claim 1, further comprising:
   responsive to the given upgrade validation test failing for the given virtual machine in the computing environment, sending a status notification to an administrator or interested party.

6. The method of claim 1, further comprising:
   responsive to the given upgrade validation test failing for the given virtual machine in the computing environment, generating an upgrade snapshot of the upgraded given virtual machine to be diagnosed.

7. The method of claim 1, wherein performing a given upgrade phase in the plurality of upgrade phases comprises:
   stopping application processes on a given virtual machine in the computing environment that must be stopped before the given upgrade phase can be performed;
   performing an upgrade on one or more software applications on the given virtual machine to form an upgraded virtual machine;
   starting software applications that must be started for validation; and
   performing the one or more upgrade validation tests on the upgraded virtual machine.

8. The method of claim 7, wherein performing a given upgrade phase in the plurality of upgrade phases further comprises:
   responsive to the one or more upgrade validation tests passing, restarting the application processes; and
   managing upgrade data and snapshots created during the given upgrade phase.

9. The method of claim 1, wherein performing the one or more upgrade validation tests on the upgraded computing environment comprises gathering test data for the one or more upgrade validation tests.

10. The method of claim 1, wherein the application dependencies comprise runtime dependencies, software prerequisites, and software products impacted by the upgrade in the computing environment.

11. A computer program product comprising a non-transitory computer readable storage medium having a computer readable program stored therein, wherein the computer readable program, when executed on a computing device, causes the computing device to:

receive selection of a computing environment to upgrade with an upgrade package, wherein the upgrade package is configured to perform an upgrade on one or more software applications in the computing environment;

discover application dependencies for the upgrade in the computing environment;

configure a plurality of upgrade phases based on the application dependencies;

selecting one or more upgrade validation test for the upgrade package based on applications to be upgraded of the computing environment and the application dependencies, wherein the one or more upgrade validation tests are specific for the selected computing environment;

generate a pre-upgrade snapshot of the computing environment;

perform each upgrade phase in the plurality of upgrade phases to form an upgraded computing environment and perform the one or more upgrade validation tests on the upgraded computing environment, wherein each phase is validated before processing to a next phase in the plurality of upgrade phases; and  responsive to a given upgrade validation test failing for a given virtual machine in the computing environment, revert the given virtual machine back to the pre-upgrade snapshot without human intervention.

12. The computer program product of claim 11, wherein the one or more upgrade validation tests comprise one or more environment specific tests imported from a customer or administrator via an application programming interface.

13. The computer program product of claim 11, wherein receiving selection of the computing environment to upgrade comprises receiving a selection of a single virtual machine, a plurality of selected virtual machines, or an enterprise wide upgrade.

14. The computer program product of claim 11, wherein the computer readable program further causes the computing device to:

responsive to a given upgrade validation test failing for a given virtual machine in the computing environment, send a status notification to an administrator or interested party.

15. The computer program product of claim 11, wherein performing a given upgrade phase in the plurality of upgrade phases comprises:

stopping application processes on a given virtual machine in the computing environment that must be stopped before the given upgrade phase can be performed;

performing an upgrade on one or more software applications cm the given virtual machine to form an upgraded virtual machine;

stating software applications that must be started for validation; and performing the one or more upgrade validation tests on the upgraded virtual machine.

16. The computer program product of claim 15, wherein performing given upgrade phase in the plurality of upgrade phases further comprises;

responsive to the one or more upgrade validation tests passing, restarting the application processes; and  managing upgrade data and snapshots created during the given upgrade phase.

17. The computer program product of claim 11, wherein the application dependencies comprise runtime dependencies, software prerequisites, and software products impacted by the upgrade in the computing environment.

18. An apparatus, comprising: a hardware processor; and a memory coupled to the processor, wherein the memory comprises instructions which, when executed by the processor, cause the processor to:

receive selection of a computing environment to upgrade with an upgrade package, wherein the upgrade package is configured to perform an upgrade on one or more software applications in the computing environment;

discover application dependencies for the upgrade in the computing environment;

configure a plurality of upgrade phases based on the application dependencies;

selecting one or more upgrade validation test for the upgrade package based on applications to be upgraded of the computing environment and the application dependencies, wherein the one or more upgrade validation tests are specific for the selected computing environment;

generate a pre-upgrade snapshot of the computing environment;

perform each upgrade phase in the plurality of upgrade phases to form an upgraded computing environment and perform the one or more upgrade validation tests on the upgraded computing environment, wherein each phase is validated before processing to a next phase in the plurality of upgrade phases; and  responsive to a given upgrade validation test failing for a given virtual machine in the computing environment, revert the given virtual machine back to the pre-upgrade snapshot without human intervention.

19. The apparatus of claim 18, wherein the one or more upgrade validation tests comprise one or more environment specific tests imported from a customer or administrator via an application programming interface.

20. The apparatus of claim 18, wherein performing a given upgrade phase in the plurality of upgrade phases comprises:

stopping application processes on a given virtual machine in the computing environment that must be stopped before the given upgrade phase can be performed;

performing an upgrade on one or more software applications on the given virtual machine to form an upgraded virtual machine;

starting software applications that must be started for validation; and performing the one or more upgrade validation tests on the upgraded virtual machine.

21. The apparatus of claim 20, wherein performing a given upgrade phase in the plurality of upgrade phases further comprises:

responsive to the one or more upgrade validation tests passing restarting the application processes; and  managing upgrade data and snapshots created during the given upgrade phase.

* * * * *